United States Patent
Egashira et al.

(10) Patent No.: US 10,252,491 B2
(45) Date of Patent: Apr. 9, 2019

(54) STRUCTURE INTEGRATED BY VACUUM-PRESSURE FORMING OR VACUUM FORMING, AND MANUFACTURING METHOD THEREOF

(75) Inventors: Ken Egashira, Kanagawa (JP); Yorinobu Takamatsu, Sagamihara (JP); Tomotaka Araki, Kanagawa (JP); Haruhiko Miyazawa, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/118,912

(22) PCT Filed: Jun. 27, 2012

(86) PCT No.: PCT/US2012/044347
§ 371 (c)(1),
(2), (4) Date: Nov. 20, 2013

(87) PCT Pub. No.: WO2013/003428
PCT Pub. Date: Jan. 3, 2013

(65) Prior Publication Data
US 2014/0162032 A1     Jun. 12, 2014

(30) Foreign Application Priority Data
Jun. 30, 2011   (JP) .................. 2011-146650

(51) Int. Cl.
*B32B 7/12* (2006.01)
*B29C 51/00* (2006.01)
(Continued)

(52) U.S. Cl.
CPC ............. *B32B 7/12* (2013.01); *B29C 51/10* (2013.01); *B29C 51/14* (2013.01); *B29C 51/002* (2013.01); *B29C 2791/006* (2013.01); *B29C 2791/007* (2013.01); *B29K 2023/12* (2013.01); *B29K 2023/14* (2013.01); *B29L 2031/722* (2013.01); *Y10T 428/24802* (2015.01)

(58) Field of Classification Search
None
See application file for complete search history.

(56) References Cited

U.S. PATENT DOCUMENTS 4,320,175 A    3/1982   Hisazumi et al.
4,769,100 A *  9/1988   Short et al. ............... 156/285
(Continued)

FOREIGN PATENT DOCUMENTS

EP    0879862    11/1998
EP    0 949 120  10/1999
(Continued)

OTHER PUBLICATIONS

International Search Report for PCT International Application No. PCT/US2012/044347 dated Feb. 26, 2013, 5 pages.

*Primary Examiner* — Laura C Powers
(74) *Attorney, Agent, or Firm* — Philip P. Soo

(57) ABSTRACT

A structure comprising a decorative sheet having a surface layer and an adhesive layer containing a polymer having 25 to 100 mass % of propylene units, and a substrate containing a polymer having 25 to 100 mass % of propylene units. The decorative sheet and the substrate are integrated by vacuum-pressure forming or vacuum forming.

16 Claims, 3 Drawing Sheets

(51) Int. Cl.
  *B29C 51/10* (2006.01)
  *B29C 51/14* (2006.01)
  *B29K 23/00* (2006.01)
  *B29L 31/00* (2006.01)

(56) References Cited

U.S. PATENT DOCUMENTS

| | | | |
|---|---|---|---|
| 5,041,338 A * | 8/1991 | Suehiro et al. | 428/516 |
| 5,061,534 A * | 10/1991 | Blemberg | B29C 47/145 |
| | | | 206/484 |
| 5,192,609 A * | 3/1993 | Carroll, Jr. | 428/328 |
| 5,348,154 A * | 9/1994 | Jacobs et al. | 206/369 |
| 6,136,415 A | 10/2000 | Spengler | |
| 6,228,504 B1 | 5/2001 | Sawada | |
| 6,326,086 B1 * | 12/2001 | Mori et al. | 428/516 |
| 6,673,428 B1 * | 1/2004 | Reafler | 428/216 |
| 2001/0019761 A1 * | 9/2001 | Iriyama | 428/200 |
| 2004/0039117 A1 * | 2/2004 | Kijima | C08L 23/04 |
| | | | 525/55 |
| 2004/0119198 A1 | 6/2004 | Alper | |
| 2004/0260001 A1 * | 12/2004 | Lin | C08K 5/01 |
| | | | 524/474 |
| 2010/0316872 A1 | 12/2010 | Takamatsu | |
| 2011/0229681 A1 | 9/2011 | Sakamoto et al. | |
| 2013/0264741 A1 | 10/2013 | Ookura et al. | |

FOREIGN PATENT DOCUMENTS

| | | |
|---|---|---|
| EP | 2498298 | 9/2012 |
| JP | S60-141546 | 7/1985 |
| JP | S63-233818 | 9/1988 |
| JP | S64-123722 | 1/1989 |
| JP | H03-150156 | 6/1991 |
| JP | 05-220830 A | 8/1993 |
| JP | 05-220843 A | 8/1993 |
| JP | 06-190919 A | 7/1994 |
| JP | 07-101031 A | 4/1995 |
| JP | 07-186274 | 7/1995 |
| JP | 08-025471 | 1/1996 |
| JP | 08-258132 A | 10/1996 |
| JP | 2001-315237 | 11/2001 |
| JP | 2001-328099 A | 11/2001 |
| JP | 2003-159741 | 6/2003 |
| JP | 3851523 | 11/2006 |
| JP | 2006-341388 | 12/2006 |
| JP | 2011-121308 | 6/2011 |
| WO | WO 1988-007416 | 10/1988 |
| WO | WO 95/23682 | 9/1995 |
| WO | WO 2007-139865 | 12/2007 |
| WO | WO 2013/173424 | 11/2013 |

* cited by examiner

STRUCTURE INTEGRATED BY VACUUM-PRESSURE FORMING OR VACUUM FORMING, AND MANUFACTURING METHOD THEREOF

CROSS REFERENCE TO RELATED APPLICATIONS

This is a national stage filing under 35 U.S.C. 371 of PCT/US2012/044347, filed Jun. 27, 2012, which claims priority to JP Application No. 2011-146650, filed Jun. 30, 2011, the disclosure of which is incorporated by reference in their entirety herein.

FIELD OF THE INVENTION

The present invention relates to a structure integrated by vacuum pressure forming or vacuum forming, and a manufacturing method thereof.

BACKGROUND

A film for replacing paint coatings is effective for improving the working environment because there are no VOCs (volatile organic compounds) and no spray mist. Furthermore, a film for replacing chrome plating is required in order to eliminate harmful chrome plating processes. A vacuum pressure forming method and a vacuum forming method have become common as methods used for these decorative films and sheets. In order to cover completely a deep drawn three-dimensional shaped object, these molding methods must be used, and a decorative film or sheet cannot be applied to this type of three-dimensional shaped object using conventional manual operations.

A polyolefin is lightweight, inexpensive, and safe, and therefore is most desirable as a resin for automotive components. However, polyolefin resin, and particularly polypropylene resin is said to be a poorly adhering material, and applying paint, metal, a film or the like is difficult.

Japanese PCT Patent Application Publication No. H2-503077 discloses a method for painting a plastic external vehicle panel of an automobile with a paint coat suitable for automotive external applications. The method comprises the step of applying a synthetic resinous material onto a surface of a soft casting sheet (42) in the shape of a thin-film, and drying a transparent coat on the casting sheet. The surface of the sheet has regular reflectivity for transferring a sufficient gloss level to the surface of the dried transparent coat for automotive external applications. The method also includes forming a color coating (46) of a colored synthetic resinous material, which is dried and then bonded to the transparent coat. The dried transparent coat and colored coating are transferred to a semihardened backing sheet (72) made of a synthetic resinous material to form a composite paint coat (44) bonded on the surface of the backing sheet. The transparent coat forms an outer surface on the transferred paint coat, the colored coating is bonded between the transparent coat and the backing sheet, and the outer surface of the transparent coat essentially maintains the gloss that is transferred from the casting sheet to the transparent coat. The backing sheet and the composite paint coat are thermally formed thereon to form a three-dimensionally shaped preliminarily formed laminate (116). The preliminarily formed laminate is placed in a mold, and a synthetic resinous substrate (118) is formed on the preliminarily formed laminate to form an automobile body exterior panel (130) with a finished automotive exterior paint coat. The transparent coat contains a material that essentially maintains the gloss level during the thermal molding process. The backing sheet has sufficient thickness and sufficient stretch to absorb defects that are present in the substrate, and maintains gloss essentially without defects on the surface of the transparent coat after the laminate is bonded to the substrate. The finished composite paint coat provides sufficient appearance and durability for use as an automotive exterior paint coat.

Japanese Patent No. 3851523 discloses a metal gloss sheet for three-dimensional molding that comprises a transparent thermoplastic resin film, a metal layer, an adhesive layer, and a thermoplastic resin film in order. The transparent thermoplastic resin film is composed of a polyester polymer compound with a benzene ring and a cyclohexane ring in the main chain, or a polyester polymer compound with a benzene ring and a naphthalene ring in the main chain.

Japanese Unexamined Patent Application Publication No. 2006-341388 discloses a method of forming a laminate sheet for thermal molding. In that method a laminate sheet for thermal molding having 1) a thermoplastic resin film layer, 2) a decorative layer with a metal vapor deposition layer or a highly volatile ink layer with metallic gloss and containing metal thin film pieces and a binder resin, and 3) a supporting base resin layer is molded at a molding temperature between $(T_1-20)°$ C. and $(T_2+35)°$ C. $T_1$ is a temperature equal to the higher of either the softening temperature of the thermoplastic resin film layer or the softening temperature of the supporting substrate resin layer, and $T_2$ is a temperature equal to the lower of either the softening temperature of the thermoplastic resin film or the softening temperature of the supporting substrate resin layer.

SUMMARY OF THE INVENTION

With a conventional method, a resin component with a decorative sheet bonded to the surface is manufactured by using a combination of a decorative sheet and a molten resin molding method such as an in-mold injection molding method. When producing a resin component with a three-dimensional shape where the maximum elongation of the decorative sheet exceeds approximately 50%, the decorative sheet will not track the shape of the mold if the sheet is sandwiched in the injection molding mold while still in a form as a flat sheet, and therefore the decorative sheet is set in a secondary mold that has been preformed by vacuum forming or the like. However, the size of the preformed decorative sheet and the injection molding mold cavity do not necessarily match. Furthermore, the decorative sheet that is placed in the cavity may develop appearance defects such as wrinkles on the surface of the molded article due to being pushed or pulled by the flow of high-pressure high-speed molten resin that is injected.

The method where a decorative sheet is applied by vacuum pressure forming or vacuum forming onto a substrate that has been molded beforehand can avoid the aforementioned problems of in mold injection molding methods. However, when applying by using vacuum pressure forming or vacuum forming, the decorative sheet is applied to a substrate that is a previously formed solid, so it is conceivable that sufficient adhesive strength will not be obtained between the decorative sheet and the substrate, particularly with a polyolefin resin molded article that is made from a poorly adhering material, as compared to a molten resin molding method where a molten high temperature resin is brought into contact with the adhesion layer surface of the decorative sheet.

The present invention can provide a structure with excellent appearance where a decorative sheet is applied by vacuum pressure forming or vacuum forming to a substrate that uses a polyolefin resin, which is a poorly adhering material, and particularly to a molded article with a three-dimensional shape such as a deep drawn shape.

The present inventors achieved the present invention by discovering that a decorative sheet with an adhesive layer containing a polymer having propylene units can be bonded by vacuum pressure forming or vacuum forming to a molded article of polypropylene resin, which is a poorly adhering material.

One aspect of the present invention provides a structure including a decorative sheet comprising a surface layer and an adhesive layer containing a polymer having 25 to 100 mass % of propylene units; and a substrate containing a polymer having 25 to 100 mass % of propylene units, wherein the decorative sheet and the substrate are integrated together by vacuum pressure forming or vacuum forming.

Another aspect of the present invention provides a manufacturing method for a structure, including a step of preparing a decorative sheet comprising a surface layer and an adhesive layer containing a polymer having 25 to 100 mass % of propylene units; a step of preparing a substrate containing a polymer having 25 to 100 mass % of propylene units; and a step of applying the decorative sheet to the substrate by vacuum pressure forming or vacuum forming and forming a structure where the decorative sheet and the substrate are integrated together.

According to the present invention, a structure can be provided where a decorative sheet is applied by vacuum pressure forming or vacuum forming to a substrate containing a polymer having propylene units, which is generally considered a poorly adhering material, and particularly to a polypropylene resin molded article with a three-dimensional shape such as a deep drawn shape.

DETAILED DESCRIPTION

Figure 1:
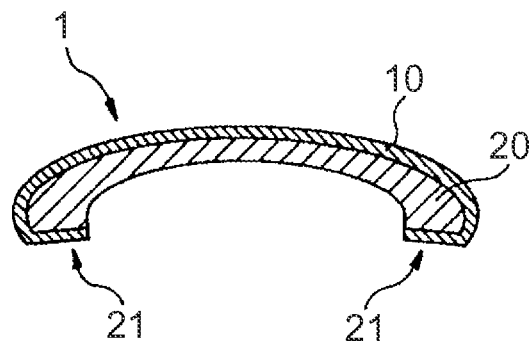
FIG. 1 is a schematic cross-section view of a structure according to one embodiment of the present disclosure.

FIG. 1 is a schematic cross-section view of a structure according to one embodiment of the present disclosure. The structure 1 includes a substrate 20 covered by a decorative sheet 10. The decorative sheet 10 has a surface layer and an adhesive layer containing a polymer having propylene units, and the substrate contains a polymer having propylene units. The decorative sheet 10 is applied to the substrate 20 by vacuum pressure forming or vacuum forming, to form an integrated structure. According to the present disclosure, the substrate 20 containing a polymer having propylene units, which has a three-dimensional shape such as a deep drawn shape rather than just a flat shape, can be coated by wrapping the decorative sheet 10 from an end part to a back surface 21 through vacuum pressure forming or vacuum forming, by using a polymer having propylene units in the adhesive layer of the decorative sheet.

The substrate containing a polymer having propylene units can be a material with various surfaces and a three-dimensional shape. Examples of polymers having polypropylene units that are included in the substrate include polypropylene (PP) and copolymers containing propylene such as ethylene-propylene copolymer, propylene-α-olefin copolymers (for example, propylene/1-butene copolymer, and propylene/1-octene copolymer), ethylene-propylene-α-olefin copolymers (for example ethylene/propylene/1-butene copolymer and ethylene/propylene/1-octene copolymer), and the like, as well as thermoplastic polyolefins (TPO) containing polypropylene which is a blend of polypropylene and other rubber copolymers. Examples of rubber copolymers with TPO containing polypropylene include the copolymers containing propylene, ethylene/α-olefin/diene copolymers (for example ethylene/propylene/diene monomer copolymers (EPDM)), butadiene rubber, isoprene rubber, natural rubber, and the like, and these rubber copolymers can be a hydrogenated adduct and can be cross-linked. Of these, polymers having propylene unit selected from the group consisting of polypropylene, ethylene/propylene copolymer, and propylene/α-olefin copolymer as well as combinations thereof are particularly preferable for having favorable injection molding properties and excellent shape stability and thermal resistance as a molded part.

The polymer having propylene units that is included in the substrate contains 25 mass % or more and approximately 100 mass % or less of propylene units. The amount of propylene units included in this polymer can be 35 mass % or higher or even approximately 50 mass % or higher.

Figure 2A:
FIG. 2a is a cross-section view of a decorative sheet according to one embodiment of the present disclosure.
Figure 2B:
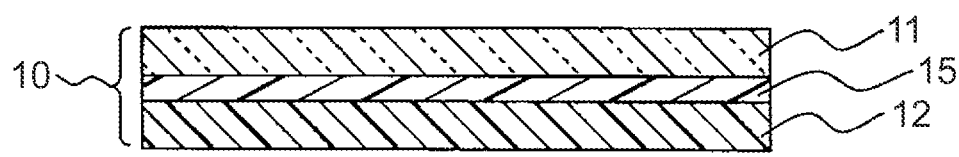
FIG. 2b is a cross-section view of a decorative sheet according to another embodiment of the present disclosure.
Figure 2C:
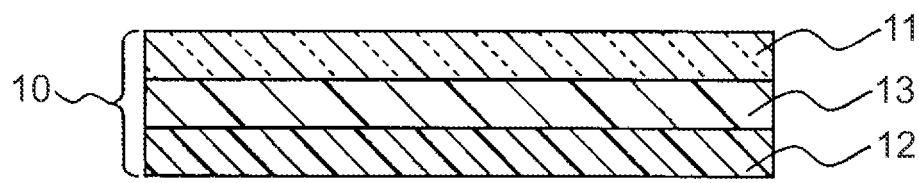
FIG. 2c is a cross-section view of a decorative sheet according to another embodiment of the present disclosure.
Figure 2D:
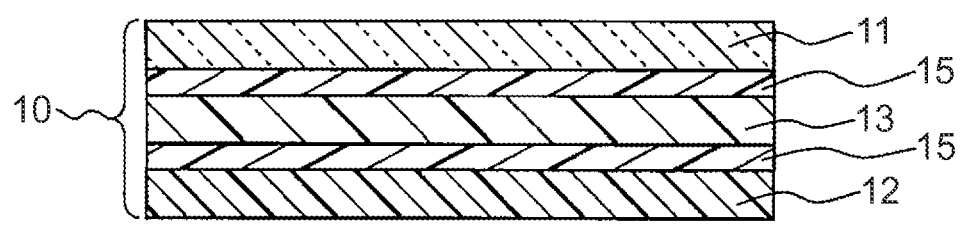
FIG. 2d is a cross-section view of a decorative sheet according to another embodiment of the present disclosure.
Figure 2E:
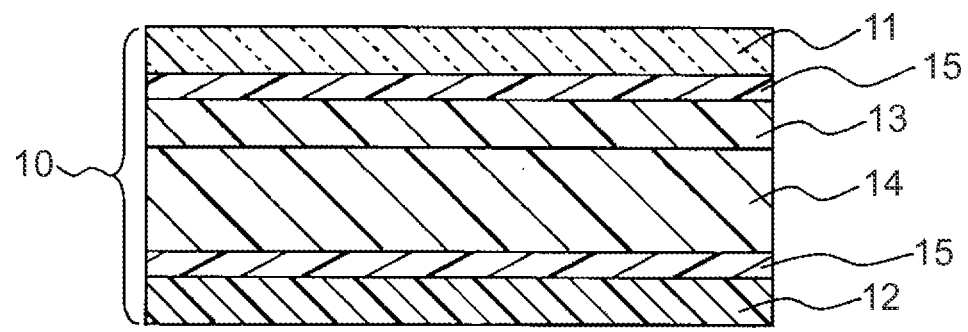
FIG. 2e is a cross-section view of a decorative sheet according to another embodiment of the present disclosure.

FIG. 2a illustrates a cross-section view of the decorative sheet 10 according to one embodiment of the present disclosure. The decorative sheet 10 includes a surface layer 11 and an adhesive layer 12. The decorative sheet 10 may also include additional layers such as a design layer, bulk layer, bonding layer, and the like as optional elements. The decorative sheet 10 of another embodiment of the present disclosure illustrated in FIG. 2b has a bonding layer 15 between the surface layer 11 and the adhesive layer 12 for bonding these layers together. The decorative sheet 10 of another embodiment of the present disclosure as illustrated in FIG. 2c has a design layer 13 that provides an appearance such as a painted color, metallic color, pattern, or the like between the surface layer 11 and the adhesive layer 12. The decorative sheet 10 of another embodiment of the present disclosure illustrated in FIG. 2d has the design layer 13 that provides an appearance such as a paint color or the like between the surface layer 11 and the adhesive layer 12, and has the bonding layer 15 between the design layer 13 and the surface layer 11 and between the design layer 13 and the adhesive layer 12. The decorative sheet 10 of another embodiment of the present disclosure illustrated in FIG. 2e has the design layer 13 that provides an appearance such as a paint color or the like and a bulk layer 14 that provides thickness to the decorative sheet between the surface layer 11 and the adhesive layer 12, and has the bonding layer 15 between the design layer 13 and the surface layer 11 and between the bulk layer 14 and the adhesive layer 12. The number, type, arrangement, and the like of layers in the decorative sheet is not restricted to the foregoing, so long as the surface layer and the adhesive layer are located on the outermost layers of the decorative sheet.

The surface layer can be any type of resin suitable for vacuum pressure forming or vacuum forming, and examples include acrylic resins containing polymethyl methacrylate (PMMA), polyurethane, fluorine resins such as ethylene/tetrafluoroethylene copolymer (ETFE), polyvinylidene fluoride (PVDF), methyl methacrylate/vinylidene fluoride copolymer (PMMA/PVDF), and the like, polyvinyl chloride (PVC), polycarbonate (PC), polyolefins such as polyethylene (PE), polypropylene (PP), and the like, polyesters such as polyethylene terephthalate (PET) and polyethylene naphthalate, and the like, and copolymers such as ethylene/acrylic acid copolymer (EAA) and ionomers thereof, ethylene/ethyl acrylate copolymers, and ethylene/vinyl acetate copolymers and the like. Acrylic resins, polyurethane, fluorine resins, and polyvinyl chloride are preferable for having excellent weather resistance, and acrylic resins and polyurethane are more preferable for having excellent abrasion resistance and minimum impact on the environment when burned or buried as waste.

The surface layer can be formed by coating a resin composition onto the adhesive layer that is included in the decorative sheet, or on the design layer or bulk layer or the like which are optional components. Alternatively, a surface layer film can be formed by coating a resin composition onto another liner, and laminating this film onto the adhesive layer, design layer, bulk layer, or the like, through a bonding layer. If the adhesive layer, design layer, bulk layer, or the like have adhesion toward the surface layer film formed on the liner, the surface layer film can be directly laminated onto these layers without interposing a bonding layer. For example, the surface layer film can be formed by coating a resin material such as a reactive polyurethane composition or the like onto a liner or the like by knife coating, bar coating, blade coating, doctor coating, roller coating, cast coating, or the like.

The reactive polyurethane composition generally contains a polyol and a cross-linking agent. The polyol can be acrylic polyol, polycaprolactone diol, other polyester polyols, polycarbonate polyol, polyethylene glycol, polypropylene glycol, other polyether polyols, or the like. The cross-linking agent can be a polyisocyanate such as hexamethylene diisocyanate, isophorone diisocyanate, tolylene diisocyanate, methylene bis(4-phenyl isocyanate), hydrogenated MDI, as well as biurets, isocyanurates, or adducts thereof. The reactive polyurethane composition can be water-based or non-water-based. Water-based polyurethane compositions can be further cross-linked by polycarbodiimide, aziridine, oxazoline, or the like. If the compositions are water-based, combinations of polycarbonate with polycarbodiimide and/or aziridine are particularly preferable, and if non-water-based, combinations of polyesters and/or glycols with isophorone diisocyanate and/or hydrogenated MDI are particularly preferable.

The surface layer can be formed before hand as a film by extruding, drawing, or the like. These films can be laminated onto the adhesive layer, design layer, bulk layer, or the like through a bonding layer. Alternatively, if the adhesive layer, design layer, bulk layer, or the like have adhesion toward this type of film, the film can be directly laminated onto these layers without interposing a bonding layer. By using a film with high flatness, the structure can be provided with an appearance with higher surface flatness. Furthermore, the surface layer can be formed together with the other layers by multilayer extrusion. The acrylic film can be a polymethyl methacrylate (PMMA) resin, polybutylene acrylate resin, ethylene/acrylic copolymer resin, ethylene vinyl acetate/acrylic copolymer resin, or the like. An acrylic film has excellent transparency, is strong toward heat and light, and will not easily fade color or change gloss even when used outdoors. Furthermore, acrylic films do not use a plasticizer, while having excellent anti-soiling properties, and moreover, these films have excellent mold processing properties that allow for deep draw processing. In particular, PMMA is preferable as a main component.

A thickness of the surface layer is optional, but generally is approximately 5 μm or more, approximately 10 μm or more, or approximately 25 μm or more, and approximately 500 μm or less, approximately 200 μm or less, or approximately 100 μm or less. If the decorative sheet is to be applied to a substrate with a complex shape, a thinner surface layer is advantageous from the perspective of conforming to the shape, and for example, approximately 200 μm or less, or approximately 100 μm or less is preferable. On the other hand, in order to provide high light resistance and/or weather resistance to the structure, a thicker surface layer is advantageous, and for example approximately 10 μm or more, or approximately 25 μm or more is preferable.

If necessary, the surface layer can also contain an ultraviolet light absorber such as benzotriazole, Tinuvin 1130 (product of BASF), or the like or a hindered amine light stabilizer (HALS) such as Tinuvin 292 (product of BASF) or the like. By using an ultraviolet light absorber, a hindered amine light stabilizer, or the like, if the decorative sheet has a design layer or other colored layer, discoloration, fading, degradation, and the like can be effectively prevented in a colorant included in that layer, and particularly in organic pigments that are relatively susceptible to light such as ultraviolet light or the like. The surface layer can also include a hard coat material or a gloss-enhancing agent, and may also have an additional hard coat layer. The surface layer may be transparent, semitransparent, or nontransparent, in order to provide an intended appearance. If the decorative sheet has a design layer or other colored layer, the surface layer is preferably transparent.

The adhesive layer contains a polymer having propylene units. Examples of polymers that have polypropylene units include polypropylene (PP) and copolymers containing propylene such as ethylene-propylene copolymer, propylene-α-olefin copolymers (for example, propylene/1-butene copolymer, and propylene/1-octene copolymer), ethylene-propylene-α-olefin copolymers (for example ethylene/propylene/1-butene copolymer and ethylene/propylene/1-octene copolymer) and the like, as well as thermoplastic polyolefins (TPO) containing polypropylene which is a blend of polypropylene and other rubber copolymers. Examples of rubber copolymers with TPO containing polypropylene include the copolymers containing propylene, ethylene/α-olefin/diene copolymers (for example ethylene/propylene/diene monomer copolymers (EPDM)), butadiene rubber, isoprene rubber, natural rubber, and the like, and these rubber copolymers can be a hydrogenated adduct and can be cross-linked. Of these, polymers having propylene units selected from the group consisting of polypropylene, ethylene/propylene copolymer, and propylene/α-olefin copolymer, as well as combinations thereof, are particularly preferable for having favorable molding properties when making an extruded film, as well as for having excellent body, shrink resistance, and heat resistance, and for being easily be procured as a commercial product.

If a melting point of the adhesive layer is low, peeling and shifting will occur because of stress on the film that has been drawn and applied. A heat resistance test for automobile exteriors is normally 80° C., based on the maximum temperature of a flat painted surface that is reached under summer sunlight. Furthermore, some manufacturers require 90° C. or even 100° C. A heat resistance test for automobile interiors is required to be at least 100° C., and usually 110° C., based on the maximum temperature of the dashboard achieved in the summer. In order to withstand these temperatures for a long time, the adhesive layer must have a melting point that is approximately 20° C. or more above the testing temperature, and therefore the melting point of the adhesive layer is preferably approximately 100° C. or higher, approximately 110° C. or higher, approximately 120° C. or higher, or approximately 130° C. or higher. The same reasons apply to the substrate as well, so a melting point of the substrate is preferably approximately 100° C. or higher, approximately 110° C. or higher, approximately 120° C. or higher, or approximately 130° C. or higher. It is particularly preferable for both the adhesive layer and the substrate to have a melting point that is approximately 130° C. or higher. The melting point of the adhesive layer and the substrate is determined by measuring the degree of crystallinity ($\Delta H$ (J/G)) and the temperature of the heat absorption peak (melting point) due to melting of crystals, using a differential scanning calorimeter (Q2000 DSC device manufactured by TA Instruments). The melting point of the adhesive layer and the substrate is measured using a 3 mg sample across a measurement temperature range of 0° C. to 20° C. at a temperature rise rate of 10° C./minute in a nitrogen gas environment at a flow rate of 50 mL/minute.

The adhesive layer can be formed before hand as a film by extruding, drawing, or the like. This film can be laminated onto the surface layer, design layer, bulk layer, or the like through a bonding layer. Alternatively, if the surface layer, design layer, bulk layer, and the like have adhesion toward the film, these layers can be directly laminated onto the film without interposing a bonding layer. An extruded film, and in particular an undrawn extruded film is preferable because the crystallinity will be low and the adhesion to the substrate will be excellent. A solvent diluted composition containing the components that make the adhesive layer can be coated onto a liner, and then the solvent removed to form an adhesive layer film, and this film can be laminated onto the adhesive layer, design layer, bulk layer, or the like through a bonding layer. Alternatively, if the design layer, bulk layer, or the like have adhesion toward the surface layer film, these layers can be directly laminated or coated onto the adhesive layer film without interposing a bonding layer. The adhesive layer can be formed together with the other layers by multilayer extrusion.

The polymer having propylene units that is included in the adhesive layer contains approximately 25 mass % or more and approximately 100 mass % or less of propylene units. The amount of propylene units included in this polymer can be approximately 35 mass % or higher or even approximately 50 mass % or higher.

The film that can be used as the adhesive layer can be a commercial polypropylene film, RXC-3 (polypropylene and ethylene/propylene/1-butene copolymer blend, ratio of propylene units of 82 mass %, product of Mitsui Chemicals Tohcello, Inc.), FX-333 (polypropylene and ethylene/propylene/1-butylene copolymer blend, ratio of propylene units of 95 mass %, product of OJK Co., Ltd.), or the like.

The adhesive layer can also be a multilayer film formed by multilayer extruding, laminating, or the like. A multilayer extruded film is preferable because the crystallinity will be low and the adhesion to the substrate will be excellent. For example, polypropylene resin containing 100 mass % of propylene units can be used as a core, in order to increase the handling properties and provide body to the entire decorative sheet by increasing the tensile stress of the entire decorative sheet, and a polyolefin resin containing less than 100 mass % of propylene units, for example 85 mass % can be used as a skin, in order to soften the surface and increase the adhesion to other layers, in a multilayer film. Therefore, the resulting multilayer film can demonstrate each of these conflicting properties at the same time. Furthermore, if the core has 30 mass % of titanium oxide, for example dispersed in a polyolefin resin containing 85 mass % of propylene units, and the skin is a polyolefin resin containing 85 mass % of propylene units, for example, the resulting multilayer extrusion can make a colored decorative sheet with hiding properties but without having titanium dioxide particles exposed on the surface.

A thickness of the adhesive layer is optional, but generally is approximately 5 μm or more, approximately 20 μm or more, or approximately 50 μm or more, and approximately 1 mm or less, approximately 500 μm or less, or approximately 250 μm or less. If the thickness of the adhesive layer is approximately 20 μm or more, or approximately 50 μm or more, a higher adhesive force can be obtained. On the other hand, if the thickness of the adhesive layer is approximately 500 μm or less, or approximately 250 μm or less, the ability of the decorative sheet to conform to the substrate can be further enhanced.

The design layer, which is an optional element, can be a patterned layer that provides the structure with a picture, a logo, or the like, or a pattern such as wood grain, marble grain, or the like, or the design layer can be a colored layer that provides a paint color, a metal color, or the like. The color layer may be a pigment dispersed in a binder resin, and the pigment can be an inorganic pigment such as titanium oxide, carbon black, chrome yellow, yellow iron oxide, red oxide, red iron oxide, and the like; an organic pigments such as phthalocyanine blue, phthalocyanine green, other phthalocyanine pigments, azo lake pigments, indigo pigments, perinone pigments, perylene pigments, quinophthalone pigments, dioxazine pigments, quinacridone red, and other quinacridone pigments; and pearlescent brightening agents such as aluminum flake, aluminum flake deposition, metal oxide coated aluminum flake, colored aluminum flake, other aluminum brightening agents, flake shaped mica and synthetic mica coated with a metal oxide such as titanium oxide or iron oxide or the like. The pattern layer can be a film, sheet, or metal foil or the like with a printed pattern. A thickness of the design layer is optional, but generally is approximately 5 μm or more, approximately 10 μm or more, or approximately 10 μm or more, and approximately 300 μm or less, approximately 200 μm or less, or approximately 100 μm or less. The color layer can also be a metal thin-film formed by vapor deposition on another layer of the decorative sheet. In this case, the thickness of the design layer can be approximately 0.1 μm or more, approximately 0.5 μm or more, or approximately 1 μm or more, and approximately 50 μm or less, approximately 20 μm or less, or approximately 10 μm or less.

The bulk layer, which is an optional element, can be any type of resin suitable for vacuum pressure forming or vacuum forming, and examples include acrylic resins containing polymethyl methacrylate (PMMA), polyurethane, polyvinyl chloride (PVC), polycarbonate (PC), acrylonitrile/butadiene/styrene copolymer (ABS), polyethylene (PE), polypropylene (PP), other polyolefins, polyethylene terephthalate (PET), polyethylene naphthalate, other polyesters, and ethylene/acrylic acid copolymer, ethylene/ethyl acrylate copolymers, and ethylene/vinyl acetate copolymers and the like. Polyurethane, PVC, PET, ABS, and polycarbonate can be preferably used as the bulk layer, from the perspective of strength and impact resistance. The bulk layer is a supporting layer for the printing film or metallic thin film that is the design layer, and provides uniform spreading during molding, and can also function as a protective layer that more effectively protects the structure from external impacts and punctures. Furthermore, the thickness of the decorative sheet can be increased by the bulk layer rather than increasing the thickness of the adhesive layer or the surface layer. A thick decorative sheet can smooth the surface of a structure by hiding unevenness on the substrate surface. A thickness of the bulk layer is optional, but is generally approximately 200 μm or more, approximately 500 μm or more, or approximately 1 mm or more, and approximately 4 mm or less, or approximately 3 mm or less.

A bonding layer can be used for bonding the aforementioned layers. The bonding layer can use a generally used solvent type, emulsion type, pressure sensitive type, heat sensitive type, or heat or ultraviolet light curing type of adhesive, such as an acrylic based, polyolefin based, polyurethane based, polyester based, or rubber based adhesive, or the like, and a thermoset type polyurethane adhesive can be preferably used. A thickness of the bonding layer is generally approximately 5 μm or more, approximately 10 μm or more, or approximately 20 μm or more, and approximately 300 μm or less, approximately 200 μm or less, or approximately 100 μm or less.

The surface layer, adhesive layer, bulk layer, bonding layer, and/or substrate may also contain a colorant such as the same inorganic pigments, organic pigments, aluminum brightening agents, pearlescent brightening agents, and the like that were described for the design layer. If the adhesive layer is a multilayer adhesive layer, the colorant can be included in the first or in a plurality of layers in the adhesive layer. If the aforementioned layers contain a colorant, aesthetic qualities can be provided to the structure without using a design layer. A decorative sheet with a design layer such as a color layer or the like may lose performance for hiding the substrate that is the base material, due to changes in the color of the design layer if the area elongation of this sheet is high, or in other words as the sheet is stretched wide, but by coloring the adhesive layer located between the design layer and the substrate with a titanium oxide, high hiding properties can be achieved, even with high stretching, without affecting the moldability or the adhesive force. In this case, the thickness of the adhesive layer is preferably approximately 25 μm or more, approximately 50 μm, or more, or approximately 75 μm or more, and approximately 1 mm or less, approximately 500 μm or less, or approximately 250 μm or less, and the amount of titanium oxide included in the adhesive layer is preferably approximately 2 mass % or more, approximately 5 mass % or more, or approximately 12 mass % or more, and approximately 80 mass % or less, approximately 70 mass % or less, or approximately 60 mass % or less. If the substrate containing a polymer having propylene units is colored with titanium oxide, high hiding properties and adhesion can be obtained even with high stretching. The amount of titanium oxide included in the substrate is preferably approximately 2 mass % or more, approximately 5 mass % or more, or approximately 12 mass % or more, and approximately 80 mass % or less, approximately 70 mass % or less, or approximately 60 mass % or less.

With the present disclosure, a thickness of the decorative sheet that can be applied to the substrate using vacuum pressure forming or vacuum forming has an extremely broad range. For example, decorative sheets with a broad range of thicknesses of approximately 10 μm or more, approximately 20 μm or more, or approximately 30 μm or more, and approximately 7 mm or less, approximately 5 mm or less, or approximately 3 mm or less can be applied to the substrate. With the present disclosure, the decorative sheet can sufficiently conform to a substrate with a complex shape and can provide a structure with excellent appearance by using a decorative sheet with a thickness of approximately 30 μm or more and approximately 350 μm or less. Furthermore, by using a thin decorative sheet in this manner, the same level of decorating can be achieved with less material than when combining preliminary vacuum forming and injection molding, and the heating time is reduced during molding so the tact time can be shortened. In comparison to the present disclosure, if a decorative sheet is made by preliminarily molding and then injection molding a base material resin thereon, if a decorative sheet with a thickness of less than approximately 350 μm is used, the shape of the sheet that is preliminarily molded cannot be maintained to match the cavity of the injection molding mold, and therefore wrinkles or the like can occur in the decorative sheet during injection molding. On the other hand, with the present disclosure, the structure can be more effectively protected from external punctures and impacts by using a decorative sheet with a thickness of approximately 800 μm or more and approximately 3 mm or less. Furthermore, unevenness of the substrate surface can be hidden and the structure surface can be smoothed by using a decorative sheet with a pre-molding thickness of approximately 1.5 mm or more and approximately 3 mm or less, and with a post molding thickness of approximately 370 μm or more and approximately 3 mm or less. In comparison to the present disclosure, if a decorative sheet is made by preliminarily molding and then injection molding a base material resin thereon, if a decorative sheet with a thickness that exceeds approximately 800 μm is used, either setting in the injection molding mold will not be possible, or the flow of the injected molten resin may be hindered.

A manufacturing method for the decorative sheet is not particularly restricted. Each layer can be manufactured as previously described. The decorative sheet can be manufactured by forming each layer on a liner such as a PET film that has been release treated on the surface, and then laminating the films together. Alternatively, each layer can be laminated in order by repeatedly performing a coating process and then a curing process, if necessary, on a single liner. A decorative sheet can also be formed by multilayer extruding the materials of each layer.

A method of applying the decorative sheet to the substrate using a vacuum pressure forming method will be described below as an example while referring to FIGS. 3a to 3e.

Figure 3A:
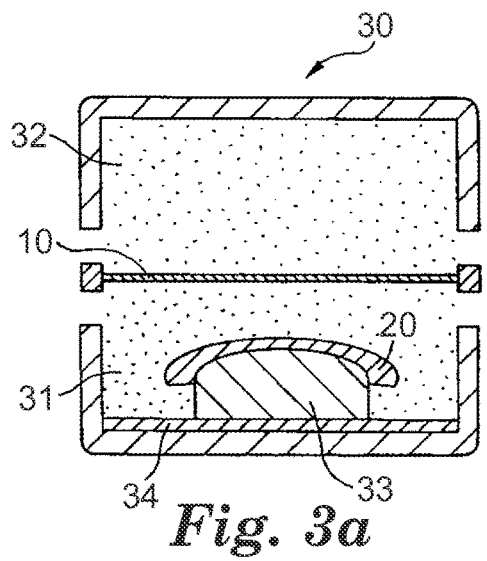
FIGS. 3a, 3b, 3c, 3d and 3e are a series of diagramtic views schematically showing a process for applying a decorative sheet to a substrate using a vacuum heating and pressurizing device.

As illustrated in FIG. 3a, a vacuum heating pressure device 30 has an upper and lower first vacuum chamber 31 and second vacuum chamber 32, and has a fixture for setting the decorative sheet 10 that is applied to the substrate 20 as an adherend between the upper and lower vacuum chambers. Furthermore, a partition plate 34 and a stand 33 are provided on a raising and lowering stand 35 (not shown in the drawings) that can be vertically raised and lowered in the first vacuum chamber 31 on the bottom side, and the substrate 20, such as a three-dimensional object or the like, is set on this stand 33. This type of vacuum heating and pressurizing device can be a commercial product such as a double surface vacuum machine (product of Fu-se Vacuum Forming) and the like.

As illustrated in FIG. 3a, first the decorative sheet 10 is set between upper and lower vacuum chambers in a condition where the first vacuum chamber 31 and second vacuum chamber 32 of a vacuum heating and pressurizing device 30 is open to atmospheric pressure. The substrate 20 is set on a stand 33 in the first vacuum chamber 31.

Figure 3B:
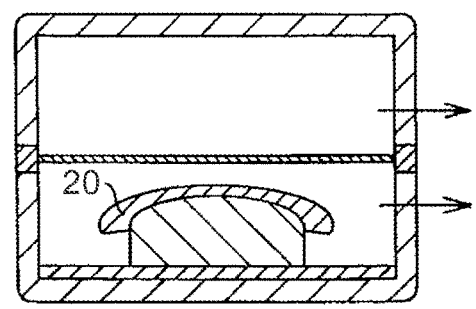
Figure 3C:
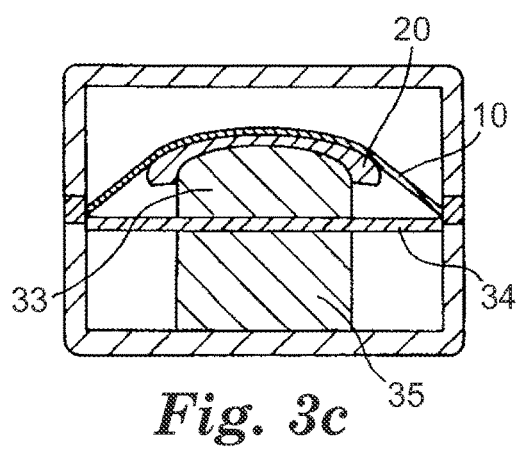

Next, as illustrated in FIG. 3b, the first vacuum chamber 31 and the second vacuum chamber 32 are closed, the pressure is reduced in both chambers until a vacuum is achieved in both chambers (for example −1 atm, if the atmospheric pressure is 0 atm.). The sheet is heated subsequently or simultaneously to a vacuum being formed. Next, as illustrated in FIG. 3c, the raising and lowering stand 35 is raised to push the substrate 22 up to the second vacuum chamber 32. Heating can be performed by a lamp heater installed in the ceiling of the second vacuum chamber 32.

Figure 3D:
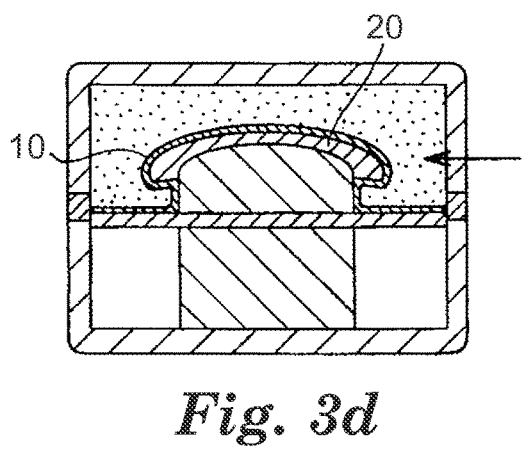

The heated decorative sheet 10 is stretched by pressing onto the surface of the substrate 20. Subsequently or simultaneously to stretching, the inside of the second vacuum chamber 32 is pressurized to an appropriate pressure (for example from 2 atm to 0 atm), as illustrated in FIG. 3d. The decorative sheet 10 is pressed tightly onto the exposed surface of the substrate 20 by the pressure difference, and is stretched to conform to the recess and protrusion shapes of the exposed surface to form a tightly adhering coating on the surface of the substrate. After reducing the pressure and heating in the condition of FIG. 3b, the inside of the second vacuum chamber 32 is pressurized in this condition, and thereby the exposed surface of the substrate 20 can be coated by the decorative sheet 10.

Figure 3E:
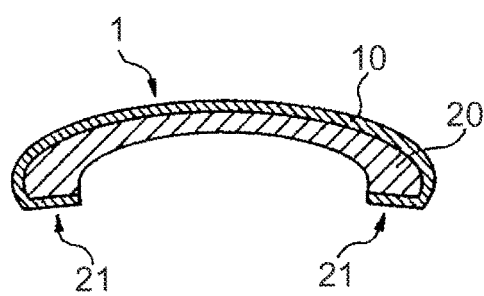

Subsequently, the upper and lower first vacuum chamber 31 and the second vacuum chamber are again opened to atmospheric pressure, and the substrate 20 that has been coated with the decorative sheet 10 is removed. As illustrated in FIG. 3e, the edges of the decorative sheet 10 that are tightly adhered to the surface of the substrate 20 are trimmed to complete the vacuum pressure forming process. In this manner, a structure 1 that has been favorably wrapped and coated can be obtained by wrapping the decorative sheet 10 around at the edges of the substrate 20 to the back surface 21 thereof and thoroughly coating the exposed surfaces.

A vacuum forming method can be performed using the same device as the device used for the vacuum pressure forming method, with the exception that there is no second vacuum chamber. For example, with the vacuum forming method, the pressure on the side of the decorative sheet that does not have the substrate is always at atmospheric pressure, and the decorative sheet is heated while the first vacuum chamber is open to atmospheric pressure, and after the decorative sheet is brought into contact with the substrate or at the same time his contact, the pressure is reduced in the first vacuum chamber, and thereby the decorative sheet can be applied to the substrate.

A setting for the heating temperature of the vacuum heating and pressurizing device can be appropriately determined within a range that does not have a negative effect on the substrate and the decorative sheet, and for example is approximately 80° C. or higher, approximately 100° C. or higher, or approximately 120° C. or higher, and approximately 220° C. or lower, approximately 200° C. or lower, or approximately 190° C. or lower. With the present disclosure, the decorative sheet can surprisingly be applied to the substrate with sufficient adhesion even if the surface temperature of the adhesive layer when the decorative sheet is applied to the substrate is at a temperature lower than the melting point of both the adhesive layer and the substrate. When the decorative sheet is applied to the substrate, the surface temperature of the adhesive layer can be for example approximately 60° C. or higher, approximately 80° C. or higher, or approximately 100° C. or higher, and approximately 190° C. or lower, approximately 170° C. or lower, or approximately 150° C. or lower. The vacuum pressure forming method is preferably used because higher adhesive force can be achieved. As the degree of vacuum during the reduced pressure process of the vacuum pressure forming method approaches a vacuum, air pockets will not easily occur during application and/or once an air pocket has formed, contours (marks) where the air has escaped will not easily occur, and therefore a favorable appearance can be obtained. Furthermore, as the degree of vacuum moves nearer to that of a vacuum, there is a surprising effect that the adhesion also increases dramatically. The degree of vacuum during the reduced pressure process of the vacuum pressure forming method is preferably approximately −0.85 atm or less, more preferably approximately −0.925 atm or less, and even more preferably approximately −0.97 atm or less, when the atmospheric pressure during decorative sheet application is 0.00 atm and a complete vacuum condition is −1.00 atm. The surface temperature of the adhesive layer is determined by attaching thermocouples (K) (product of Sakaguchi E. H Voc Corp.) to the substrate surface using heat resistant tape without covering the surface to be measured, and then measuring the surface temperature of the adhesive layer of the decorative sheet, starting before and continuing until after applying the decorative sheet. The surface temperature is measured at a monitor interval of 100 ms, using a mobile temperature recorder NR-1000 (Keyence Corporation).

The maximum surface elongation rate of the decorative sheet after molding is generally approximately 50% or higher, approximately 100% or higher, or approximately 200% or higher, and approximately 2000% or lower, approximately 1000% or lower, or approximately 500% or lower. The surface elongation rate is defined as:

$$\text{surface elongation rate } (\%) = (B-A)/A$$

(where A is an area of a certain region of the decorative sheet before molding, and B is an area of the region of the decorative sheet corresponding to A after molding). For example, if the area of a certain region of the decorative sheet is 100 cm$^2$ before molding and the area of that region of the substrate after molding is 250 cm$^2$, the elongation rate is 150%. The maximum surface elongation rate is the value of the region with the highest area elongation rate, taken from the decorative sheet on the entire surface of the molded product. When a flat sheet is applied to a substrate with a three-dimensional shape using vacuum pressure forming or vacuum forming, the area where the sheet initially contacts with substrate will be essentially unstretched and the area elongation rate will be essentially 0%, but the edge part that is applied last will be greatly stretched and the area elongation rate will be 200% or higher, and thus the surface elongation will vary dramatically depending on the region. Whether or not problems such as sheet breakage and lack of conformance to the substrate occurs in the region of the sheet that is most stretched determines the acceptability of molding, and therefore a practical indicator for acceptance of a molded product is the maximum area elongation rate, or in other words the surface elongation rate of the region that is most stretched, rather than the average surface elongation rate of the entire molded product. The maximum surface elongation rate can be confirmed by printing 1 mm squared graduation marks on the entire surface of the decorative sheet prior to molding, and then measuring the change in the area after molding, or by measuring the thickness of the decorative sheet before and after molding. The thickness of the decorative sheet after molding will vary depending on the region of the decorative sheet, similar to the surface elongation rate, but generally is approximately 7 μm or more, approximately 12 μm or more, or approximately 20 μm or more, approximately 200 μm or more, or approximately 375 μm or more, and the thickness of the decorative sheet before molding will be the same, essentially the same, or lower, such as approximately 3 mm or less, approximately 1.5 mm or less, approximately 1 mm or less, or approximately 350 μm or less.

The structure of the present disclosure can be an automotive component, home electronics product, vehicle (railroad car or the like), construction material, or the like.

Working Examples

The structure of the present disclosure and the manufacturing method thereof are described in further detail while referring to the following working examples.
<Fabricating Silver Decorative Sheet A>

A silver decorative sheet A having the configurations shown in Table 1 was fabricated as described below using the adhesive layer films shown in Table 2.

Surface layer: 70 g of water dispersible polycarbonate-based polyurethane R-986 (product of DSM), 0.5 g of Tinuvin 292 (light stabilizer, product of BASF), 0.85 g of Tinuvin 1130 (ultraviolet light absorber, product of BASF), 0.2 g of Triton GR-7M (product of Dow Chemical), 0.1 g of AMP95 (product of Dow Chemical), 3 g of deionized water, and 5.6 g of polycarbodiimide based cross-linking agent Carbodilight v-02 (product of Nisshinbo Chemical Inc.) were blended and stirred to obtain a pre-solution. The pre-solution was bar coated onto a PET film, and after drying for 3 minutes at 90° C., and then drying for another 3 minutes at 160° C., a surface layer film was obtained.

Colored layer: 5 g of aluminum paste 7430 NS (product of Toyo Aluminum K. K.) was blended and stirred with an equivalent amount of butyl acetate, and then 100 g of the pre-solution of working example 9 in Japanese Unexamined Patent Application 2009-35588 (solid fraction 25%) was blended and stirred to obtain a pre-solution. The pre-solution was applied by bar coating onto a PP surface of a laminate film containing biaxially stretched PP film and PET film, and then dried for 5 minutes at 80° C. in a convection oven, and then dried and cured for 15 minutes at 120° C. to obtain the color layer film.

Bonding layer (surface layer/color layer): 80 g of Nipporan 3124 polyurethane adhesive (product of Nippon Polyurethane Industry Co., Ltd.), 4 g of Coronate HL (product of Nippon Polyurethane Industry Co., Ltd.), and 40 g of ethyl acetate were blended and mixed to fabricate a pre-solution. The pre-solution was bar coated onto the color layer, dried for 3 minutes at 80° C. in a convection oven, and then the bonding layer was brought into contact with the corona processed surface layer film and overlaid using a roll laminator.

Bonding layer (color layer/adhesive layer): The pre-solution used for the aforementioned bonding layer was bar coated onto the adhesive layer film that had been corona processed, dried in a convection oven for 3 minutes at 80° C., and then the PP and PP films were peeled from a laminate body consisting of the layers from the surface layer to the color layer, and the film was applied onto the color layer using a roller laminator so as to contact the bonding layer.

Subsequently, the PET film was peeled from the surface of the surface layer of the film, residual solvent was removed if necessary, and then accelerated curing by heat was performed in order to accelerate reaction curing. In this manner, silver decorative sheets A with various adhesive layers were fabricated.

TABLE 1

Silver decorative sheet A

| | Thickness (μm) | |
|---|---|---|
| Surface layer | 30 | Water-based polyurethane |
| Bonding layer | 20 | Thermoset polyurethane adhesive |
| Color layer | 50 | Aluminum flake dispersed acrylic adhesive |
| Bonding layer | 20 | Thermoset polyurethane adhesive |
| Adhesive layer | 50-400 | Refer to Table 2 |

TABLE 2

Types of adhesive layer films for silver decorative sheet A

| Adhesive layer | Type | Thickness (μm) | Melting point (° C.) | Propylene (mass %) | Part number, source |
|---|---|---|---|---|---|
| Adhesive layer 1 | PP | 400 | 155 | 100 | ST-500, Tatsuta Chemical |
| Adhesive layer 2 | TPO | 100 | 160 | 95 | FX-333, OJK Co., Ltd. |
| Adhesive layer 3 | TPO | 100 | 143 | 82 | RXC-3, Mitsui Chemical Tohcello |
| Adhesive layer 4 | TPO | 100 | 141 | 76 | Film made of Sun Aroma resin C200F |
| Adhesive layer 5 | TPO | 100 | 143 | 50 | Propylene 50% film, Gunze Ltd. |
| Adhesive layer 6 | PE | 50 | 110 | 0 | Poly tube 500 mm wide, Thermo Package Co., Ltd. |
| Adhesive layer 7 | Polymethyl pentene | 100 | 230-240 | 0 | X-88B, Mitsui Chemical |
| Adhesive layer 8 | PC | 100 | 250 | 0 | Lactone polycarbonate film, International Chemical |
| Adhesive layer 9 | ABS | 100 | — | 0 | 975 BK1, Shinnetsu Polymer |
| Adhesive layer 10 | PMMA | 125 | — | 0 | S001, Sumitomo Chemical |

<Fabricating Black Decorative Sheet>

A black decorative sheet having the configurations shown in Table 3 was fabricated as described below.

(50 μm Thick Black Decorative Sheet)

Surface layer: A surface layer film was obtained by the same procedures as the surface layer for the silver decorative sheet A.

Color layer (also acts as a surface layer/adhesive layer bonding layer)/Adhesive layer: 80 g of Nipporan 3124 polyurethane adhesive (product of Nippon Polyurethane Industry Co., Ltd.), 4 g of Coronate HL (product of Nippon Polyurethane Industry Co., Ltd.), 40 g of ethyl acetate, and 30 g of carbon black urethane resin dispersion TT501 (product of BASF) were blended and mixed to fabricate a pre-solution. The pre-solution was applied by bar coating onto the polyolefin resin surface of a corona treated adhesive layer film (PET film laminated on a polyolefin film containing 89 mass % of propylene units, prototype product of OG Corporation), dried for 3 minutes in a convection oven at 80° C., and then applied using a roller laminator onto a corona treated surface layer film so as to contact the color layer.

Subsequently, the PET film was peeled from the surface of the surface layer of the film and the surface of the adhesive layer, residual solvent was removed as necessary, and then accelerated curing by heat was performed in order to accelerate reaction curing. In this manner, a 50 μm black decorative sheet was fabricated.

(245-2265 μm Black Decorative Sheet)

From surface layer to bulk layer: The pre-solution that was used for the bonding layer of the silver decorative sheet A was applied by bar coating onto PC films of various thicknesses that had been corona treated, dried for 3 minutes in a convection oven at 80° C., and then a corona treated PMMA film Technology S001 (product of Sumitomo Chemical) was overlaid using a roller laminator. The single PMMA film layer was used as is without a PC film (240 μm thick).

Colored layer: 10 g of carbon black urethane resin dispersion TT501 (product of BASF) and 100 g of the pre-solution of working example 9 in Japanese Unexamined Patent Application 2009-35588 (solid fraction 25%) were blended and stirred to obtain a pre-solution. The pre-solution was applied by bar coating onto a PP surface of a laminate film containing biaxially stretched PP film and PET film, dried for 5 minutes in a convection oven at 80° C., dried and cured for 5 minutes at 120° C., and then overlaid onto a bulk layer (surface layer if there is no bulk layer) of a laminate body including from the surface layer to the bulk layer, so as to contact with the color layer.

Bonding layer (color layer/adhesive layer): The pre-solution that was used for the bonding layer of the silver decorative sheet A was applied by bar coating onto a corona treated TPO film RXC-3 (product of Mitsui Chemicals Tohcello, Inc), dried in a convection oven for 3 minutes at 80° C., the PP and PP films were peeled from the color layer of a laminate body consisting of the layers from the surface layer to the color layer, and then the film was applied onto the color layer using a roller laminator so as to contact the bonding layer.

Subsequently, the PET film was peeled from the surface of the surface layer of the film, residual solvent was removed if necessary, and then accelerated curing by heat was performed in order to accelerate reaction curing. In this manner, a 245 to 2265 μm black decorative sheet was fabricated.

TABLE 3

Black decorative sheet

| Decorative sheet thickness (μm) | | Thickness (μm) | Description |
|---|---|---|---|
| 50 | Surface layer | 10 | Water-based polyurethane |
| | Color layer (bonding layer) | 10 | Carbon black dispersed thermoset polyurethane adhesive |
| | Adhesive layer | 30 | Propylene 89% polyolefin |
| 245-2265 | Surface layer | 75 | PMMA film |
| | Bonding layer | 0 or 20 | Thermoset polyurethane adhesive |
| | Bulk layer | 0-2000 | PC film |
| | Color layer | 50 | Carbon black dispersed acrylic adhesive |
| | Bonding layer | 20 | Thermoset polyurethane adhesive |
| | Adhesive layer | 100 | TPO film (RXC-3) |

<Fabricating Silver Decorative Sheet B and White Decorative Sheet>

A silver decorative sheet B and a white decorative sheet having the configurations shown in Table 4-1 were fabricated as described below.

Surface layer: A surface layer film was obtained by the same procedures as the surface layer for the silver decorative sheet A.

100 mass parts of low density polyethylene resin master batch pellets containing 30 mass % of metallic aluminum powder with an average particle diameter of 6 to 7 μm (PEX496 Silver A1 #090, product of Tokyo Ink) and 200 mass parts of colorless polypropylene resin pellets (Novatec MA-3, product of Japan Polypropylene Corporation) were blended and then extruded using a heating and melting continuous film forming device to fabricate a silver colored adhesive layer film where 10 mass % of aluminum brightening agent was dispersed in a polyolefin resin containing 67 mass % of polypropylene units. The melting point was measured at 161° C.

White adhesive layer: A white film (prototype product of Gunze) where 10 mass % of a titanium oxide was dispersed in a polyolefin resin containing 85 mass % of propylene units was used.

Bonding layer (surface layer/silver or white adhesive layer): The pre-solution used for the bonding layer of the silver decorative sheet A was applied by bar coating onto various adhesive layer films that had been corona treated, dried in a convection oven for 3 minutes at 80° C., and then the film was applied onto the surface layer using a roller laminator so as to contact the bonding layer.

Subsequently, the PET film was peeled from the surface of the surface layer of the film, residual solvent was removed if necessary, and then accelerated curing by heat was performed in order to accelerate reaction curing. In this manner, silver decorative sheet B and a white decorative sheet were fabricated.

TABLE 4-1

Silver decorative sheet B and white decorative sheet

| Decorative sheet | | Thickness (μm) | Description |
|---|---|---|---|
| Silver B | Surface layer | 30 | Water-based polyurethane |
| | Bonding layer | 20 | Thermoset polyurethane adhesive |

TABLE 4-1-continued

Silver decorative sheet B and white decorative sheet

| Decorative sheet | | Thickness (μm) | Description |
|---|---|---|---|
| | Adhesive layer | 150 | 5% aluminum flake dispersed polypropylene 85% polyurethane |
| White | Surface layer | 30 | Water-based polyurethane |
| | Bonding layer | 20 | Thermoset polyurethane adhesive |
| | Adhesive layer | 150 | 10% titanium oxide dispersed polypropylene 85% polyurethane |

<Fabricating Silver Decorative Sheet C>

A silver decorative sheet C having the configurations shown in Table 4-2 was fabricated as described below.

Surface layer: A surface layer film was obtained by the same procedures as the surface layer for the silver decorative sheet A.

Color layer: A color layer film was obtained by the same procedures as the color layer for the silver decorative sheet A.

Adhesive layer: For the adhesive layer, in addition to a TPO film RXC-3 (product of Mitsui Chemicals Tohcello, Inc.), a white film where 5 mass % of titanium oxide was dispersed in a polyolefin resin containing 82 mass % of propylene units (prototype product of Futamura Chemical Co., Ltd.) and white films where 10, 15, 30, and 50 mass % of titanium oxide were dispersed in polyolefin resin containing 85 mass % of propylene units (prototype product of Gunze) were used.

Bonding layer (surface layer/color layer): The pre-solution used in the bonding layer of silver decorative sheet A was applied by bar coating, dried for 3 minutes in a convection oven at 80° C., and then the bonding layer was brought into contact with the corona processed surface layer film and overlaid using a roll laminator.

Bonding layer (color layer/adhesive layer): The pre-solution that was used for the bonding layer of the silver decorative sheet A was applied by bar coating onto the adhesive layer film that had been corona processed, dried in a convection oven for 3 minutes at 80° C., the PP and PP films were peeled from a laminate body including the layers from the surface layer to the color layer, and then the film was applied onto the color layer using a roller laminator so as to contact the bonding layer.

Subsequently, the PET film was peeled from the surface of the surface layer of the film, residual solvent was removed if necessary, and then accelerated curing by heat was performed in order to accelerate reaction curing. In this manner, silver decorative sheets C with various adhesive layers were fabricated.

TABLE 4-2

Silver decorative sheet C

| Decorative sheet | | | Thickness (μm) | Description |
|---|---|---|---|---|
| Silver C | Surface layer | | 30 | Water-based polyurethane |
| | Bonding layer | | 20 | Thermoset polyurethane adhesive |
| | Color layer | | 50 | 15% Aluminum flake dispersed acrylic adhesive |
| | Bonding layer | | 20 | Thermoset polyurethane adhesive |
| | Adhesive layer | $TiO_2$ - 0 | 100 | TPO film (RXC-3) |
| | | $TiO_2$ - 5 | 150 | 5% titanium oxide dispersed polypropylene 82% polyolefin |
| | | $TiO_2$ - 10 | 100 | 10% titanium oxide dispersed polypropylene 85% polyolefin |
| | | $TiO_2$ - 15 | 200 | 15% titanium oxide dispersed polypropylene 85% polyolefin |
| | | $TiO_2$ - 30 | 200 | 30% titanium oxide dispersed polypropylene 85% polyolefin |
| | | $TiO_2$ - 50 | 200 | 50% titanium oxide dispersed polypropylene 85% polyolefin |

<Substrate>

Substrate 1 through substrate 8, which were flat or essentially planar shaped (with a size of approximately 50 to 75 mm×100 to 150 mm×2 to 3 mm thick), and PP plates having a grained surface with a surface roughness of Ra: 5.454 μm and Rz: 20.708 μm, which are lamp bezels made of PP for automobiles, containing $TiO_2$—5, $TiO_2$—30, and $TiO_2$—50 (MH4, product of Topla Sangyo Co., Ltd.), were used as substrates. $TiO_2$—5, $TiO_2$—30 and $TiO_2$—50 were made by extruding the same material as the adhesive layer film of the silver decorative sheet C as a flat plate. The melting points based on actual measurement values using the same measurement method as the adhesive layer or based on general market data are presented in

TABLE 5

| | Appearance | Type | Polymer polymerization units (mass %) | | | Part number, source, melting point |
|---|---|---|---|---|---|---|
| | | | Propylene | Other olefins | Non-olefins | |
| Substrate 1 | Colorless | Olefin PP | 100 | 0 | 0 | Novatec MH4 Topla Sangyo Co., Ltd. 170° C. |
| Substrate 2 | | TPO | 72 | 28 | 0 | TSOP Toyota solid bumper piece 164° C. |

TABLE 5-continued

|  | Appearance | Type | Polymer polymerization units (mass %) | | | Part number, source, melting point |
|---|---|---|---|---|---|---|
|  |  |  | Propylene | Other olefins | Non-olefins |  |
| Substrate 3 |  | TPO | 50 | 0 | 0 | Propylene 50% film Gunze Ltd. (same as adhesive layer 5) 143° C. |
| Substrate 4 |  | PE | 0 | 100 | 0 | Niporon Hard 1000 Topla Sangyo Co., Ltd. 134° C. |
| Substrate 5 |  | Polymethyl pentene | 0 | 100 | 0 | X-88B Mitsui Chemicals Inc. (same as adhesive layer 7) 230° C. |
| Substrate 6 | Non-olefins | PC | 0 | 0 | 100 | PC1600 Takiron Co., Ltd. 240° C. |
| Substrate 7 |  | ABS | 0 | 0 | 100 | ABS-N-WN Shin-Kobe Electric Machinery Co., Ltd. Approximately 130° C. (not clear) |
| Substrate 8 |  | PMMA | 0 | 0 | 100 | Komo Glass Kuraray Co., Ltd. (no melting point, softens above 100° C.) |
| $TiO_2$ - 5 | White | 5% titanium oxide dispersed polypropylene 82% polyolefin | | | | — |
| $TiO_2$ - 30 |  | 30% titanium oxide dispersed polypropylene 85% polyolefin | | | | — |
| $TiO_2$ - 50 |  | 50% titanium oxide dispersed polypropylene 85% polyolefin | | | | — |

<Molding Method>

The following three types of molding methods were used with the present embodiment.

A. Vacuum Pressure Forming

Device: NGF-0709 (manufactured by Fu-se Vacuum Forming)

Pressure (based on atmospheric pressure of 0.00 atm when decorative sheet applied and perfect vacuum of −1.00 atm); reduced pressure: −0.99, −0.95, −0.90, and −0.80 atm, pressure: 0, 1, and 2 atm Heating set temperature: 130, 150, 170, and 190° C.

Decorative sheet: Set in opening with inner dimensions of 260×260 mm square

Substrate: Set at lowest position 80 mm from opening

Area elongation rate (flat plate): 150% (center part of opening) to 200% (corner of 150 mm square substrate)

Area elongation rate (lamp bezel): Approximately 100% at vertical wall surface (sidewall) (Determined by placing on a silicon resin stand placed at the center of the opening, and measuring the area after a decorative sheet printed with 1 mm square marks was applied)

B. Vacuum Forming

Same as A except for the pressure; pressure and reduced pressure: −0.99 atm

C. Preliminary Vacuum Forming and In-Mold Injection Molding (Comparative Example)

The periphery of a decorative sheet preliminarily molded by vacuum forming was trimmed and then the decorative sheet was placed on the cavity side of a door mold for injection molding with a material thickness of 2.5 mm, and then molten polypropylene at 230° C. was injected to integrate the decorative sheet and the injection resin.

<Evaluation Method>

The following evaluations were all performed at ambient temperature (20 to 25° C.)

Adhesive force: When a decorative sheet sample with a width of 10 mm and a length of 100 mm was applied onto a flat substrate and peeled at 180° at a rate of 200 mm/minute, the peeling force and the force at break (N/10 mm) were measured three times and the average value was taken as the adhesive force.

Ambient condition adhesive force: The adhesive force was measured by the above method 24 hours after applying the decorative sheet.

Heat resistance adhesive force: The adhesive force was measured by the above method after applying the decorative sheet, leaving for 168 hours in a convection oven at 80° C., and then measuring 24 hours after removal from the oven.

Water resistance adhesive force: The adhesive force was measured by the above method after applying the decorative sheet, immersing in 40° C. water for 168 hours, and then measuring 24 hours after removal from the water.

Shear Holding Force: An aluminum plate was overlaid using adhesive onto the surface (10 mm×10 mm) of a decorative sheet that was applied to a flat substrate, a 1 kg sheer direction load was applied and maintained at 80° C., the time until the aluminum plate dropped was measured 3 times, and the average value was taken as the shear holding force.

Adhesive layer temperature: The surface temperature of the adhesive layer of the decorative sheet was determined by attaching thermocouples (K) (product of Sakaguchi E. H Voc Corp.) to the substrate surface using heat resistant tape without covering the surface to be measured, and then measuring the surface temperature of the adhesive layer of the decorative, starting before and continuing until after applying the decorative sheet. The surface temperature was measured at a monitor interval of 100 ms, using a mobile temperature recorder NR-1000 (Keyence Corporation).

Sharpness measurement: The flatness of the decorative sheet surface was measured using PGD-IV (product of Tokyo Koden Co., Ltd.)

Hiding properties measurement: The color difference ΔE* of a decorative sheet sample that was stretched 150% and applied was measured using a Spectraflash SF-600 (product of Data Color) and compared to a sample that was applied to a substrate without stretching.

The combinations of the substrate and the adhesive layer of the silver decorative sheet A were changed, and in some of the combinations, the heating set temperature was changed and then the decorative sheet was applied to the substrate using the vacuum pressure forming method, at an area elongation rate of 150%, a reduced pressure of −0.99 atm, and a pressure of 2 atm. The results for the evaluation of the ambient condition adhesive force are presented in Table 6 and Table 7.

TABLE 6

| | Adhesive layer | Propylene (mass %) | Set temperature (° C.) | A | B | C | D | E |
|---|---|---|---|---|---|---|---|---|
| | | | | \multicolumn{5}{c}{Substrate} |
| | | | | 1 | 2 | 3 | 4 | 5 |
| | | | | \multicolumn{5}{c}{Propylene (mass %)} |
| | | | | 100 | 72 | 50 | 0 | 0 |
| | | | | \multicolumn{5}{c}{Ambient condition adhesive force (N/10 mm)} |
| Examples 1a-c Comparative examples 1d-e | 1 | 100 | 150 | 22.2 | 25.0 | 24 | 0 | 0 |
| Examples 2a-c Comparative examples 2d-e | 2 | 95 | 150 | 12.0 | 18.8 | 14.5 | 0 | 0 |
| Examples 3a-c Comparative examples 3d-e | 3 | 82 | 150 | 11.5 | 19.7 | 12.2 | 0 | 0 |
| Examples 4a-c Comparative examples 4d-e | 4 | 76 | 150 | 12.3 | 12 | 13 | 0 | 0 |
| Examples 5a-c Comparative examples 5d-e | 5 | 50 | 150 | 8.4 | 12.3 | 13.8 | 0 | 0 |
| Comparative example 6a-e | 6 | 0 | 150 | 0.7 | 0.1 | 0.2 | 1.2 | 0 |
| | | | 170 | 1.3 | 0.2 | 0.3 | 2.8 | 0 |
| Comparative example 7a-e | 7 | 0 | 150 | 0 | 0 | 0 | 0 | 0 |
| | | | 170 | 0 | 0 | 0 | 0 | 0 |

Ambient condition adhesive force: Pass criteria for automotive exterior blackout film: 6.4 N/10 mm or more

TABLE 7

| | Adhesive layer | Substrate | Set temperature (° C.) | Ambient condition adhesive force (N/10 mm) |
|---|---|---|---|---|
| Comparative Example 8 | 8 | 6 | 150 | 0 |
| | | | 170 | 0 |
| | | | 190 | 0 [1] |
| Comparative Example 9 | 9 | 7 | 150 | 0 |
| | | | 170 | 0 |
| | | | 190 | 0.9 [1] |
| Comparative Example 10 | 10 | 8 | 150 | 0 |
| | | | 170 | 1.2 |
| | | | 190 | 4 [2] |

[1] Break occurred

[2] Amoeba shaped appearance variation defect occurred

Using a decorative sheet having adhesive layer 3 (TPO film, RXC-3, melting point 143° C.) and substrate 1 (propylene 100 mass %), the relationship between the ambient condition adhesive force and the molding conditions and actual measurement temperature of the adhesive layer surface during either vacuum pressure forming or vacuum forming at an area elongation rate of 150% is presented in Table 8.

TABLE 8

| | Molding method | Film heating set temperature (° C.) | Actual measured temperature of adhesive layer surface (° C.) | Ambient condition adhesive force (N/10 mm) |
|---|---|---|---|---|
| Example 6 | Vacuum pressure | 130 | 74 | 12.3 |
| Example 7 | Reduced pressure −0.99 atm | 150 | 86 | 16.8 |
| Example 8 | | 170 | 115 | 15.7 |
| Example 9 | Pressure 2.00 atm | 190 | 145 | 13.3 |
| Example 10 | Vacuum pressure | 130 | 78 | 11.7 |

TABLE 8-continued

| | Molding method | Film heating set temperature (° C.) | Actual measured temperature of adhesive layer surface (° C.) | Ambient condition adhesive force (N/10 mm) |
|---|---|---|---|---|
| Example 11 | Reduced | 150 | 95 | 16.3 |
| Example 12 | pressure −0.99 atm Pressure 1.00 atm | 170 | 115 | 14.0 |
| Example 13 | Vacuum pressure | 130 | 80 | 11.6 |
| Example 14 | Reduced | 150 | 93 | 15.1 |
| Example 15 | pressure −0.99 atm Pressure 0.00 atm | 170 | 116 | 14.6 |
| Example 16 | Vacuum forming | 130 | 83 | 2.7 |
| Example 17 | Reduced | 150 | 96 | 4.8 |
| Example 18 | pressure −0.99 atm | 170 | 102 | 6.5 |

Using a decorative sheet having adhesive layer 3 (TPO film, RXC-3), substrate 1 (propylene 100 mass %), and substrate 2 (propylene 72 mass %), the relationship between the ambient condition adhesive force and the molding conditions and the appearance during vacuum pressure forming at an area elongation rate of 150% is presented in Table 9.

TABLE 9

| | Molding method | Film heating set temperature (° C.) | Ambient condition adhesive force (N/10 mm) Substrate 1 | Ambient condition adhesive force (N/10 mm) Substrate 2 | Appearance |
|---|---|---|---|---|---|
| Example 6 | Vacuum pressure | 130 | 12.3 | 12.8 | Flat and favorable |
| Example 7 | Reduced | 150 | 16.8 | 19.7 | |
| Example 8 | pressure −0.99 atm Pressure 2.00 atm | 170 | 15.7 | 19.3 | |
| Example 19 | Vacuum pressure | 130 | 10 | 11.6 | Partially remaining contours where air pockets escaped |
| Example 20 | Reduced | 150 | 18.8 | 20.1 | |
| Example 21 | pressure −0.95 atm Pressure 2.00 atm | 170 | 16.7 | 18.7 | |
| Example 22 | Vacuum pressure | 130 | 4.4 | 1.4 | |
| Example 23 | Reduced | 150 | 5.1 | 4 | |
| Example 24 | pressure −0.90 atm Pressure 2.00 atm | 170 | 6.9 | 7.7 | |
| Example 25 | Vacuum pressure | 130 | 3.2 | 1.3 | Occurrence of air pockets in some areas |
| Example 26 | Reduced | 150 | 3.4 | 1.8 | |
| Example 27 | pressure −0.80 atm Pressure 2.00 atm | 170 | 4.4 | 3.4 | |

Using a decorative sheet having adhesive layer 3 (TPO film, RXC-3), substrate 1 (propylene 100 mass %), and substrate 2 (propylene 72 mass %), the ambient condition adhesive force, heat resistance adhesive force, water resistance adhesive force, and shear holding force were evaluated during vacuum pressure forming at an area elongation rate of 150%, reduced pressure: −0.99 atm, and pressure: 2 atm, and the results are presented in Table 10.

TABLE 10

| | Substrate | Set temperature (° C.) | Ambient condition adhesive force[1] (N/10 mm) | Heat resistance adhesive force[1] (N/10 mm) | Water resistance adhesive force[1] (N/10 mm) | Shear holding force[2] (minutes) |
|---|---|---|---|---|---|---|
| Example 28 | 1 | 130 | 12.0 | 8.8 | 7.1 | 1440< |
| Example 29 | | 150 | 16.8 | 16.3 | 14.5 | 1440< |
| Example 30 | | 170 | 15.7 | 20.5 | 20.5 | 1440< |
| Example 31 | 2 | 130 | 12.8 | 12.1 | 11.8 | 1440< |
| Example 32 | | 150 | 19.7 | 20.5 | 20.5 | 1440< |
| Example 33 | | 170 | 19.3 | 12.0 | 16.0 | 1440< |

[1]Pass criteria for automotive exterior blackout film: 6.4 N/10 mm or more
[2]Pass criteria for automotive exterior blackout film: 1440 minutes or more Black decorative sheet of various thicknesses were applied onto lamp bezels made of PP for automobiles (three-dimensional molded part) using the vacuum pressure forming method, and then the moldability of the decorative sheet was evaluated. Furthermore, as a comparative example, the moldability when preliminary vacuum forming and in-mold injection molding were combined was also evaluated. The results are shown in Table 11.

TABLE 11

| | Decorative sheet thickness (μm) | Molding method | Set temperature (° C.) | Moldability[2] |
|---|---|---|---|---|
| Example 34 | 50 | Vacuum pressure | 150 | OK |
| Example 35 | 245 | Reduced | | OK |
| Example 36 | 315 | pressure −0.99 atm | | OK |
| Example 37 | 365 | Pressure 2.00 atm | | OK |
| Example 38 | 765 | | | OK |
| Example 39 | 1265 | | | OK |
| Example 40 | 2265 | | | OK |
| Comparative Example 11 | 50 | Preliminary vacuum | 150-200 ↓ 230 [1] | NG [3] |

TABLE 11-continued

| | Decorative sheet thickness (μm) | Molding method | Set temperature (° C.) | Moldability[2] |
|---|---|---|---|---|
| Comparative Example 12 | 245 | forming ↓ In-mold | | NG [3] |

TABLE 11-continued

|  | Decorative sheet thickness (μm) | Molding method | Set temperature (° C.) | Mold-ability [2] |
|---|---|---|---|---|
| Comparative Example 13 | 315 | injection molding | | NG [3] |
| Comparative Example 14 | 365 | | | OK |
| Comparative Example 15 | 765 | | | OK |
| Comparative Example 16 | 1265 | | | NG [4] |
| Comparative Example 17 | 2265 | | | NG [4] |

[1] Injection resin temperature
[2] Area elongation rate: 100% on vertical wall surface (sidewall)
[3] Preliminary vacuum forming sheet shape holding properties were insufficient, so wrinkles occurred during injection molding.
[4] The preliminary vacuum formed sheet was too thick, so resin flow was hindered during injection molding, and the resin charge was incomplete.

Black decorative sheets of various thicknesses were applied to PP plates having a grain surface with surface roughness values of Ra: 5.454 μm and Rz: 20.708 μm, and then, after vacuum pressure forming was performed at an area elongation rate of 150%, reduced pressure: −0.99 atm, and pressure: 2 atm, it was confirmed whether unevenness of the grain surface could be relieved and a smooth surface formed on the application surface of the decorative sheet. The appearance and the sharpness were evaluated, and the results are presented in Table 12.

TABLE 12

|  | Decorative sheet thickness (μm) | Appearance | Sharpness [1] |
|---|---|---|---|
| Reference Example 1 | 50 | Same grain as substrate | 0 |
| Reference Example 2 | 245 | Same grain as substrate | 0 |
| Reference Example 3 | 315 | Same grain as substrate | 0 |
| Reference Example 4 | 765 | Rough grain | 0 |
| Example 41 | 1265 | Slight unevenness | 0.1–0.2 |
| Example 42 | 2265 | Nearly smooth | 0.6–0.7 |

[1] Pass fail criteria for sharpness
0.5 or higher: Pass, level of horizontal painted surface of automotive exterior panel
0.2 or higher: Pass, level of vertical painted surface of automotive exterior panel
0.1 or lower: Fail Using a white decorative sheet and the silver decorative sheet B, with the adhesive layer colored, vacuum pressure forming was performed at an area elongation rate of 150%, reduced pressure: −0.99 atm, and pressure: 2 atm, and the results for the evaluation of the moldability, appearance, and ambient condition adhesive force are presented in Table 13.

TABLE 13

|  | Decorative sheet | Sub-strate | Mold-ability | Appearance | Ambient condition adhesive force (N/10 mm) |
|---|---|---|---|---|---|
| Example 43 | Silver B | 1 | OK | Uniform silver color | 9.8 |
| Example 44 | | 2 | OK | Uniform silver color | 8.9 |
| Example 45 | White | 1 | OK | Uniform white color | 15 |
| Example 46 | | 2 | OK | Uniform white color | 8.3 |

Vacuum pressure forming conditions: Pressure: 2 atm, set temperature: 150° C., and area elongation rate of 150%

The hiding properties were evaluated when a silver decorative sheet C with a colored layer and having an adhesive layer that was colored white (other than $TiO_2$—0) was applied to the substrate. Furthermore, the effect on the hiding properties when the substrate was colored was also evaluated. Vacuum pressure forming was performed at an area elongation rate of 150%, reduced pressure: −0.99 atm, and pressure: 2 atm, and the results for the evaluation of the moldability, hiding properties (ΔE*), and ambient condition adhesive force are presented in Table 14.

TABLE 14

|  | Silver Decorative Sheet C | Substrate | Mold-ability | Hiding properties [1] (ΔE*) | Ambient condition adhesive force (N/10 mm) |
|---|---|---|---|---|---|
| Reference Example 5 | $TiO_2$ - 0 | 1 | OK | 1.81 | 14.7 |
| Example 47 | $TiO_2$ - 5 | | OK | 0.99 | 17.8 |
| Example 48 | $TiO_2$ - 10 | | OK | 0.84 | 15.7 |
| Example 49 | $TiO_2$ - 15 | | OK | 0.39 | 15.7 |
| Example 50 | $TiO_2$ - 30 | | OK | 0.34 | 16.9 |
| Example 51 | $TiO_2$ - 50 | | OK | 0.36 | 29.2 |
| Example 52 | $TiO_2$ - 0 | $TiO_2$ - 5 | OK | 0.48 | 9.6 |
| Example 53 | | $TiO_2$ - 30 | OK | 0.25 | 8.1 |
| Example 54 | | $TiO_2$ - 50 | OK | 0.25 | 10.2 |
| Example 55 | $TiO_2$ - 30 | $TiO_2$ - 5 | OK | 0.3 | 10.4 |
| Example 56 | | $TiO_2$ - 30 | OK | 0.25 | 11.8 |
| Example 57 | | $TiO_2$ - 50 | OK | 0.26 | 11.2 |

[1] Pass fail criteria for hiding properties
Less than 0.5: Pass, Difference cannot be determined even when visually compared end to end, meets the value for the automobile external panel painting standard
0.5 or higher, oh less than 1.5: Pass, Difference is seen when visually compared end to end, but not unsatisfactory
1.5 or higher: Fail, Color difference can easily be seen.

What is claimed is:

1. A structure comprising:
a previously formed solid substrate having a deep drawn shape and containing a polymer having 25 to 100 mass % of propylene units; and
a decorative sheet comprising a surface layer and an adhesive layer adherable to the substrate, the adhesive layer consisting essentially of polymer having at least 25 mass % at propylene units selected from: polypropylene, copolymer containing propylene having up to 95 mass % of propylene units, or blends thereof in a thermoplastic olefin resin; and
wherein the decorative sheet is applied to the substrate by vacuum pressure forming; and
wherein the structure demonstrates an ambient condition adhesive force between the decorative sheet and the substrate of greater than 6.5 N/10 mm.

2. The structure according to claim 1, wherein a melting point of the adhesive layer and the substrate is 130° C. or higher.

3. The structure according to claim 1, wherein integration is performed by vacuum pressure forming where a level of vacuum is −0.925 atm or less.

4. The structure according to claim 1, wherein a maximum surface area elongation rate of the decorative sheet after molding is 50% or higher.

5. The structure according to claim 1, wherein a thickness of the decorative sheet is from 30 μm to 3 mm before molding, and from 7 μm to 3 mm after molding.

6. The structure according to claim 5, wherein the thickness of the decorative sheet is 30 μm to 350 μm before molding, and 7 μm to 350 μm after molding.

7. The structure according to claim 5, wherein the thickness of the decorative sheet is 800 μm to 3 mm before molding, and 200 μm to 3 mm after molding.

8. The structure according to claim 1, wherein the adhesive layer contains a colorant.

9. The structure according to claim 1, wherein at least one of the adhesive layer and the substrate contains titanium oxide, and a design layer is further provided between the surface layer and the adhesive layer.

10. The structure according to claim 1, wherein the adhesive layer contains a multilayer extruded film comprising:
a core comprising a polyolefin resin containing the polymer, the polymer comprising 100 mass % of propylene units; and
a skin comprising a polyolefin resin containing less than 100 mass % of propylene units.

11. The structure according to claim 1, wherein the substrate is an article molded before the decorative sheet is applied to the substrate.

12. The structure according to claim 11, wherein the substrate is a molded article with a three-dimensional shape.

13. A manufacturing method for the structure at claim 1, comprising:
a step of preparing the decorative sheet comprising the surface layer and the adhesive layer containing the polymer resin;
a step of preparing the previously formed solid substrate containing the polymer having 25 to 100 mass % of propylene units; and
a step of applying the decorative sheet to the previously formed solid substrate by vacuum pressure forming and forming the structure where the decorative sheet and the substrate are integrated together;
wherein the structure demonstrates an ambient condition adhesive force between the decorative sheet and the substrate of greater than 6.5 N/10 mm.

14. The method according to claim 13, wherein said step of preparing the substrate is molding the substrate before the decorative sheet is applied to the substrate.

15. A structure comprising:
a previously formed solid substrate having a deep drawn shape and containing a polymer having 25 to 100 mass % of propylene units; and
a decorative sheet comprising a surface layer and an adhesive layer comprising a multilayer extruded film, the adhesive layer comprising:
a core adherable to the substrate, the core consisting essentially of polymer having at least 25 mass % of propylene units selected from: polypropylene, copolymer containing propylene having up to 95 mass % of propylene units, or blends thereof in a thermoplastic olefin resin; and
a skin comprising a polyolefin resin containing less than 100 mass % of propylene units; and
wherein the decorative sheet is applied to the substrate by vacuum pressure forming;
wherein the structure demonstrates an ambient condition adhesive force between the decorative sheet and the substrate of greater than 6.5 N/10 mm.

16. The structure according to claim 15, wherein the polymer of the core is selected from: polypropylene, ethylene/propylene copolymer, and propylene/α-olefin copolymer.

* * * * *